(12) United States Patent
Onyemauwa et al.

(10) Patent No.: US 10,343,122 B2
(45) Date of Patent: Jul. 9, 2019

(54) FLUOROPOLYMERS AND MEMBRANES COMPRISING FLUOROPOLYMERS (I)

(71) Applicant: Pall Corporation, Port Washington, NY (US)

(72) Inventors: Frank Okezie Onyemauwa, Pace, FL (US); Hassan Ait-Haddou, Melville, NY (US)

(73) Assignee: Pall Corporation, Port Washington, NY (US)

( * ) Notice: Subject to any disclaimer, the term of this patent is extended or adjusted under 35 U.S.C. 154(b) by 150 days.

(21) Appl. No.: 15/237,172

(22) Filed: Aug. 15, 2016

(65) Prior Publication Data

US 2018/0043313 A1    Feb. 15, 2018

(51) Int. Cl.
   *C08F 8/26*       (2006.01)
   *B01D 67/00*      (2006.01)
   (Continued)

(52) U.S. Cl.
   CPC .......... *B01D 71/32* (2013.01); *B01D 67/003* (2013.01); *B01D 67/0011* (2013.01);
   (Continued)

(58) Field of Classification Search
   CPC .......... C08F 12/18; C08F 212/14; C08F 8/26; C08F 8/30; C08F 12/20; C08F 12/22;
   (Continued)

(56) References Cited

U.S. PATENT DOCUMENTS

| 4,954,256 A | 9/1990 | Degen et al. |
| 5,232,600 A | 8/1993 | Degen et al. |

(Continued)

FOREIGN PATENT DOCUMENTS

| JP | H07-74290 B2 | 8/1995 |
| JP | 2002-540928 A | 12/2002 |

(Continued)

OTHER PUBLICATIONS

Valade et al., "Random and Block Styrenic Copolymers Bearing Both Ammonium and Fluorinated Side-Groups", Journal of Polymer Science Part A: Polymer Chemistry, 49(21): 4668-4679 (2011) (Year: 2011).*

(Continued)

*Primary Examiner* — Latosha Hines
(74) *Attorney, Agent, or Firm* — Leydig, Voit & Mayer, Ltd.

(57) ABSTRACT

Disclosed are a copolymer, porous membranes made from the copolymer, and a method of treating fluids using the porous membranes to remove metal ions, for example, from fluids originating in the microelectronics industry, wherein the copolymer includes polymerized monomeric units I and II, wherein monomeric unit I is of the formula A-X—$CH_2$—B, wherein A is Rf—$(CH_2)$n, Rf is a perfluoro alkyl group of the formula $CF_3$—$(CF_2)_x$—, wherein x is 3-12, n is 1-6, X is O or S, and B is vinylphenyl, the monomeric unit II is haloalkyl styrene, and optionally wherein the halo group of haloalkyl is replaced with an optional substituent, for example, ethylenediamine tetra acetic acid, iminodiacetic acid, or iminodisuccinic acid.

15 Claims, 3 Drawing Sheets

PVC/AN, Poly(PFOTMS-ran-CMS) and NaHCO3 particle blend

Membrane with particles

Membrane after solvent evaporation and particle removal

(51) Int. Cl.

| | | |
|---|---|---|
| B01D 71/32 | (2006.01) | |
| B01D 71/80 | (2006.01) | |
| C08F 212/14 | (2006.01) | |
| C08F 293/00 | (2006.01) | |
| C08J 7/04 | (2006.01) | |
| C08J 9/28 | (2006.01) | |
| C08J 9/36 | (2006.01) | |
| C08F 12/20 | (2006.01) | |
| C08F 12/22 | (2006.01) | |
| C08F 12/30 | (2006.01) | |
| C08F 8/30 | (2006.01) | |
| B01D 71/28 | (2006.01) | |
| B01D 71/76 | (2006.01) | |
| C08F 12/18 | (2006.01) | |

(52) U.S. Cl.
CPC ..... *B01D 67/0013* (2013.01); *B01D 67/0093* (2013.01); *B01D 71/28* (2013.01); *B01D 71/76* (2013.01); *B01D 71/80* (2013.01); *C08F 8/26* (2013.01); *C08F 8/30* (2013.01); *C08F 12/20* (2013.01); *C08F 12/22* (2013.01); *C08F 12/30* (2013.01); *C08F 212/14* (2013.01); *C08F 293/005* (2013.01); *C08J 7/047* (2013.01); *C08J 9/28* (2013.01); *C08J 9/36* (2013.01); *B01D 2323/02* (2013.01); *B01D 2323/36* (2013.01); *B01D 2325/36* (2013.01); *C08F 12/18* (2013.01); *C08F 2438/02* (2013.01); *C08J 2201/0502* (2013.01); *C08J 2325/02* (2013.01); *C08J 2327/08* (2013.01); *C08J 2327/18* (2013.01); *C08J 2333/20* (2013.01); *C08J 2425/02* (2013.01)

(58) Field of Classification Search
CPC .. C08F 12/30; C08F 2438/02; C08F 293/005; B01D 2323/02; B01D 2323/36; B01D 2325/36; B01D 67/0011; B01D 67/0013; B01D 67/003; B01D 67/0093; B01D 71/28; B01D 71/32; B01D 71/76; B01D 71/80; C08J 2201/0502; C08J 2325/02; C08J 2327/08; C08J 2327/18; C08J 2333/20; C08J 2425/02; C08J 7/047; C08J 9/28; C08J 9/36
See application file for complete search history.

(56) References Cited

U.S. PATENT DOCUMENTS

| | | | |
|---|---|---|---|
| 2009/0277837 A1 | 11/2009 | Liu et al. | |
| 2013/0211026 A1* | 8/2013 | Merlo | B01D 71/32 526/243 |
| 2016/0288063 A1* | 10/2016 | Ait-Haddou | C08J 7/047 |

FOREIGN PATENT DOCUMENTS

| | | |
|---|---|---|
| JP | 2015-164718 A2 | 9/2015 |
| JP | 2016-137455 A2 | 8/2016 |
| KR | 2013-0105180 A | 9/2013 |
| SG | 10201502131 | 12/2015 |
| WO | WO 2009/137245 A2 | 11/2009 |
| WO | WO 2012/133538 A1 | 10/2012 |

OTHER PUBLICATIONS

Bouteiller, Veronique et al., "Synthesis, thermal and surface characterization of fluorinated polystyrenes", Polymer International, 48, 1999, pp. 765-772 (Year: 1999).*

European Search Report, Extended European Search Report issued in European Application No. 17184752.8 (dated Dec. 21, 2017) 10 pp.
Couture et al., "Polymeric materials as anion-exchange membranes for alkaline fuel cells", *Progress in Polymer Science*, 36(11): 1521-2557 (2011).
Sata et al., "Effect of Hydrophobicity of Ion Exchange Groups of Anion Exchange Membranes on Permselectivity between Two Anions", *Journal of Physical Chemistry*, 99(34): 12875-12882 (1995).
Valade et al., "Random and Block Styrenic Copolymers Bearing Both Ammonium and Fluorinated Side-Groups", *Journal of Polymer Science Part A: Polymer Chemistry*, 49(21): 4668-4679 (2011).
Intellectual Property Office of Singapore, Search Report issued in Singapore Application No. 10201706490U (dated Jan. 29, 2018) 2 pp.
Korean Intellectual Property Office, Notice of Non-Final Rejection issued in Korean Application No. 10-2017-0103188 (dated Feb. 2, 2018).
Martinelli et al., "Surface behavior of modified-polystyrene triblock copolymers with different macromolecular architectures", *European Polymer Journal*, 51: 69-78 (2014).
Yasani et al., "A comparison between different fouling-release elastomer coatings containing surface-active polymers", *Biofouling: the Journal of Bioadhesion and Biofilm Research*, 30(4): 387-399 (2014).
Bouteiller et al., "Synthesis, thermal and surface characterization of fluorinated polystyrenes", *Polymer International*, vol. 48, pp. 765-772 (1999).
Boutevin et al., "Synthese D'Ethers et de Thioethers Allyliques Fluores par Catalyse par Transfert de Phase", *Journal of Fluorine Chemistry*, vol. 35, pp. 399-410 (1987).
Hoepken et al., "Low Surface Energy Polystyrene", *Macromolecules*, vol. 25, pp. 1461-1467 (1992).
Kim et al., "Comb-Like Fluorinated Polystyrenes Having Different Side Chain Interconnecting Groups", *Macromolecules*, vol. 42, pp. 3333-3339 (2009).
Kim et al., "Dispersion polymerization in supercritical carbon dioxide using comb-like fluorinated polymer surfactants having different backbone structures", *Journal of Supercritical Fluids*, vol. 55, pp. 381-385 (2010).
Shin et al., "Phase behavior of a ternary system of poly[p-perfluorooctyl-ethylene(oxy, thio, sulfonyl)methyl styrene] and poly[p-decyl(oxy, thio, sulfonyl)methyl styrene] in supercritical solvents", *Journal of Supercritical Fluids*, vol. 47, pp. 1-7 (2008).
Steele et al., "Linear abrasion of a titanium superhydrophobic surface prepared by ultrafast laser microtexturing", *Journal of Micromechanics and Microengineering*, vol. 23, No. 11 (Abstract only).
Canadian Intellectual Property Office, Office Action issued in Canadian Application No. 2,976,504 (dated Jul. 13, 2018) 5 pp.
Korean Intellectual Property Office, Notice of Final Rejection on Reexamination issued in Korean Application No. 10-2017-0103188 (dated Nov. 15, 2018) 6 pp.
Japan Office Action, Notice of Reasons for Rejection issued in Japanese Application No. 2017-153614 (dated Sep. 4, 2018) 6 pp.
Korean Intellectual Property Office, Notice of Final Rejection issued in Korean Application No. 10-2017-0103188 (dated Aug. 29, 2018) 6 pp.
Taiwan Intellectual Property Office, Office Action issued in Taiwanese Application No. 106126556 (dated May 6, 2018) 9 pp.
Korean Intellectual Property Office, Notice of Final Rejection on Reexamination issued in Korean Application No. 10-2018-0161339 (dated Jan. 10, 2019) 17 pp.
U.S. Appl. No. 15/237,192, filed Aug. 15, 2016.

* cited by examiner

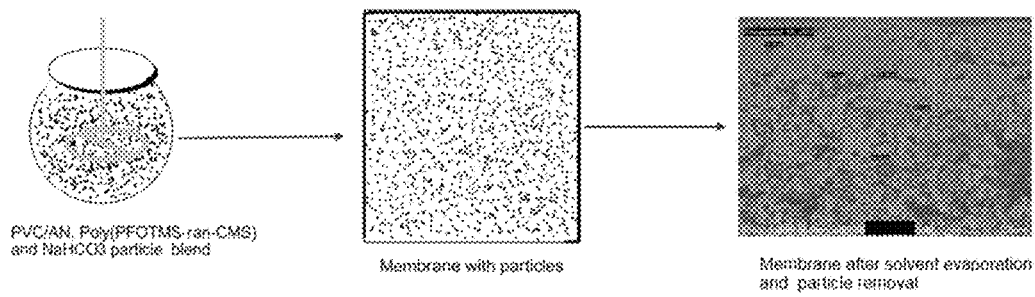
Fig. 1
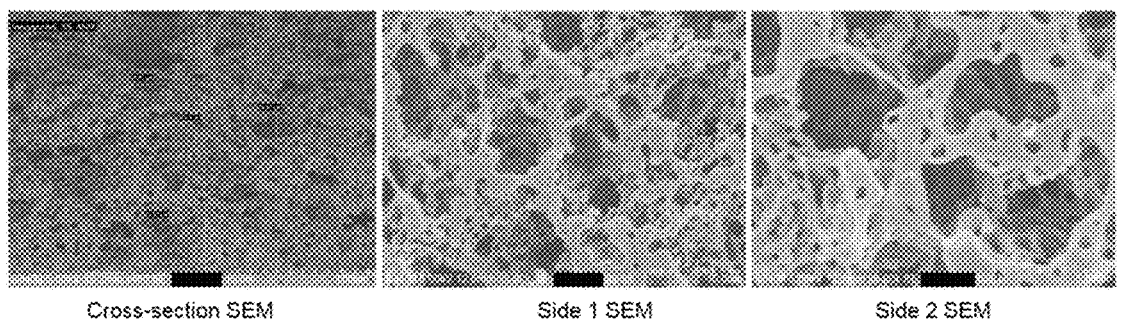
Fig. 2A     Fig. 2B     Fig. 2C
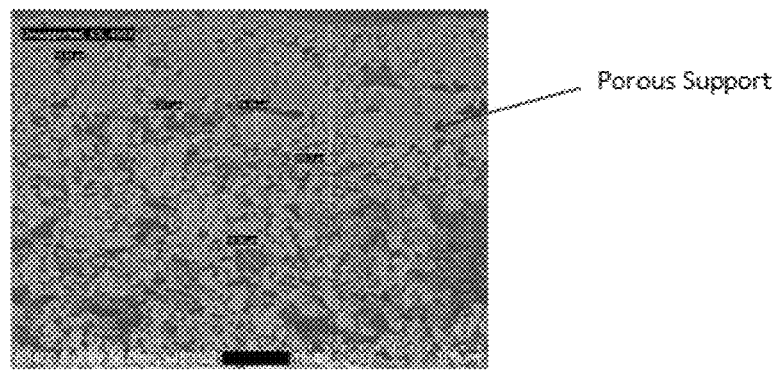
Fig. 3

FLUOROPOLYMERS AND MEMBRANES COMPRISING FLUOROPOLYMERS (I)

BACKGROUND OF THE INVENTION

Membranes comprising fluoropolymers are being considered for filtering a variety of fluids, for example, for removing trace metal impurities from microelectronics fluids. Some of these membranes are characterized by low surface energy values or critical wetting surface tension (CWST) values and/or high resistance to organic solvents and aggressive chemicals. Despite the one or more of the advantages of these membranes, there exists a need for fluoropolymers and membranes comprising such fluoropolymers with improved properties such as low CWST values and/or increased resistance to organic solvents and/or aggressive chemicals.

BRIEF SUMMARY OF THE INVENTION

The invention provides fluoropolymers with low CWST values and membranes made from the fluoropolymers. In an embodiment, the invention provides a copolymer comprising polymerized monomeric units I and II, wherein monomeric unit I is of the formula: A—X—$CH_2$—B, wherein A is Rf—$(CH_2)_n$, Rf is a perfluoro alkyl group of the formula $CF_3$—$(CF_2)_x$—, x is 3-12, n is 1-6, X is O or S, and B is vinylphenyl, and monomeric unit II is haloalkyl styrene, and optionally wherein the halo group of haloalkyl styrene is replaced with a substituent selected from the group consisting of alkoxy, alkylcarbonyl, hydroxyalkyl. an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

The copolymer is a superhydrophobic polymer and can be used to impart oleophobic properties material surfaces, i.e., a surface tension of below 25 dynes/cm. The invention also provides a method of preparing a porous membrane comprising the copolymer disposed on a porous support. The invention further provides a method of filtering fluids, particularly microelectronics fluids to a concentration below 1 ppb, preferably below 0.005 ppb or below detection limit of most instruments.

BRIEF DESCRIPTION OF THE SEVERAL VIEWS OF THE DRAWINGS

FIG. 1 illustrates a method preparing a porous membrane in accordance with an embodiment of the invention, wherein a particle such as $NaHCO_3$ is used to create pores.

FIG. 2A depicts an SEM micrograph of the cross-section of a flat sheet membrane prepared in accordance with an embodiment of the invention. FIG. 2B depicts an SEM micrograph of one side of the flat sheet membrane. FIG. 2C depicts an SEM micrograph of the other side of the flat sheet membrane.

FIG. 3 depicts an SEM micrograph of the cross-section of a porous membrane prepared in accordance with another embodiment of the invention.

DETAILED DESCRIPTION OF THE INVENTION

Figure 4:
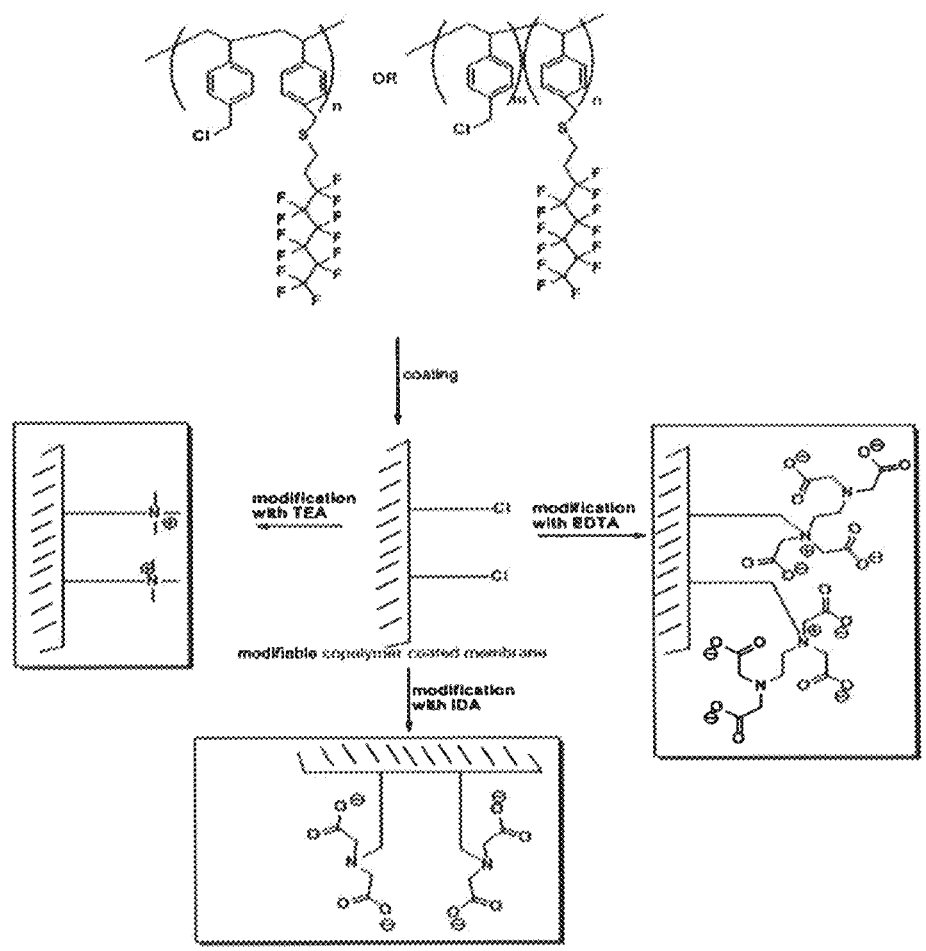
FIG. 4 illustrates a method of modifying a porous membrane according to an embodiment to include functional groups on the surface.

In accordance with an embodiment, the invention provides a copolymer comprising polymerized monomeric units I and II, wherein monomeric unit I is of the formula: A—X—$CH_2$—B, wherein A is Rf—$(CH_2)_n$, Rf is a perfluoro alkyl group of the formula $CF_3$—$(CF_2)_x$—, x is 3-12, n is 1-6, X is O or S, and B is vinylphenyl, and monomeric unit II is haloalkyl styrene, and optionally wherein the halo group of haloalkyl styrene is replaced with a substituent selected from the group consisting of alkoxy, alkylcarbonyl, hydroxyalkyl. an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

In an embodiment of the copolymer, n=2, 3, or 4, particularly 2.

In any of the above embodiments, x=4, 5, 6, 7, or 8, particularly 6.

In any of the above embodiments, the monomeric unit II is chloroalkyl styrene, particularly chloromethyl styrene. The haloalkyl, or chloroalkyl, can be meta or para substituted on styrene, or monomer II can be a mixture of meta and para substituted haloalkyl styrenes.

The perfluoroalkyl group can be present on the phenyl ring of B in any suitable position, ortho, meta, or para, preferably meta or para positions, or a mixture of o, m, and/or para isomers can be used. Herein, "p/m" designates a mixture of para and meta isomers.

In any of the above embodiments, the copolymer is a block copolymer, for example, a diblock, a triblock, or a multiblock copolymer, or a random copolymer.

The "alkyl" group could be linear or branched. In accordance with an embodiment, the alkyl group is preferably a $C_1$-$C_{22}$ alkyl. Examples of alkyl group include methyl, ethyl, n-propyl, isopropyl, n-butyl, sec-butyl, isobutyl, tert-butyl, n-pentyl, isopentyl, n-hexyl, hexadecyl, and the like. This definition also applies wherever "alkyl" occurs such as in hydroxyalkyl, monohalo alkyl, dihalo alkyl, and trihalo alkyl. The $C_1$-$C_{22}$ alkyl group can also be further substituted with a cycloalkyl group, e.g., a $C_3$-$C_{11}$ cycloalkyl group.

In accordance with an embodiment, the "alkoxy" group is preferably a $C_1$-$C_{22}$ alkoxy. Examples of alkoxy group include methoxy, ethoxy, n-propoxy, isopropoxy, n-butoxy, sec-butoxy, isobutoxy, tert-butoxy, n-pentoxy, isopentoxy, n-hexoxy, hexadecyloxy, and the like.

The term "halo" refers to a halogen selected from the group consisting of fluorine, chlorine, bromine, and iodine, preferably chlorine.

Whenever a range of the number of atoms in a structure is indicated (e.g., a $C_{1-22}$, a $C_{1-12}$, $C_{1-8}$, $C_{1-6}$, or $C_{1-4}$ alkyl, alkoxy, etc.), it is specifically contemplated that any subrange or individual number of carbon atoms falling within the indicated range also can be used. Thus, for instance, the recitation of a range of 1-22 carbon atoms (e.g., $C_1$-$C_{22}$), 1-20 carbon atoms (e.g., $C_1$-$C_{20}$), 1-18 carbon atoms (e.g., $C_1$-$C_{20}$), 1-16 carbon atoms (e.g., $C_1$-$C_{16}$), 1-14 carbon atoms (e.g., $C_1$-$C_{14}$), 1-12 carbon atoms (e.g., $C_1$-$C_{12}$), 1-10 carbon atoms (e.g., $C_1$-$C_{10}$), 1-8 carbon atoms (e.g., $C_1$-$C_8$), 1-6 carbon atoms (e.g., $C_1$-$C_6$), 1-4 carbon atoms (e.g., $C_1$-$C_4$), 1-3 carbon atoms (e.g., $C_1$-$C_3$), or 2-8 carbon atoms (e.g., $C_2$-$C_8$) as used with respect to any chemical group (e.g., alkyl, alkoxy, etc.) referenced herein encompasses and specifically describes 1, 2, 3, 4, 5, 6, 7, 8, 9, 10, 11, 12, 13, 14, 15, 16, 17, 18, 19, 20, 21, or 22 carbon atoms, as appropriate, as well as any sub-range thereof, e.g., 1-2 carbon atoms, 1-3 carbon atoms, 1-4 carbon atoms, 1-5 carbon atoms, 1-6 carbon atoms, 1-7 carbon atoms, 1-8 carbon atoms, 1-9 carbon atoms, 1-10 carbon atoms, 1-11 carbon atoms, 1-12 carbon atoms, 1-13 carbon atoms, 1-14 carbon atoms, 1-15 carbon atoms, 1-16 carbon atoms, 1-17 carbon atoms, 1-18 carbon atoms, 1-19 carbon atoms, 1-20 carbon atoms, 1-21 carbon atoms, and 1-22 carbon atoms, and anything in between such as 2-3 carbon atoms, 2-4 carbon atoms, 2-5 carbon atoms, 2-6 carbon atoms, 2-7 carbon atoms, 2-8 carbon atoms, 2-9 carbon atoms, 2-10 carbon atoms, 2-11 carbon atoms, 2-12 carbon atoms, 2-12 carbon atoms, 2-13 carbon atoms, 2-14 carbon atoms, 2-15 carbon atoms, 2-16 carbon atoms, 2-17 carbon atoms, 2-18 carbon atoms, 2-19 carbon atoms, 2-20 carbon atoms, 2-21 carbon atoms, and 2-22 carbon atoms, 3-4 carbon atoms, 3-5 carbon atoms, 3-6 carbon atoms, 3-7 carbon atoms, 3-8 carbon atoms, 3-9 carbon atoms, 3-10 carbon atoms, 3-11 carbon atoms, 3-12 carbon atoms, 3-13 carbon atoms, 3-14 carbon atoms, 3-15 carbon atoms, 3-16 carbon atoms, 3-17 carbon atoms, 3-18 carbon atoms, 3-19 carbon atoms, 3-20 carbon atoms, 3-21 carbon atoms, and 3-22 carbon atoms, and 4-5 carbon atoms, 4-6 carbon atoms, 4-7 carbon atoms, 4-8 carbon atoms, 4-9 carbon atoms, 4-10 carbon atoms, 4-11 carbon atoms, 4-12 carbon atoms, 4-13 carbon atoms, 4-14 carbon atoms, 4-15 carbon atoms, 4-16 carbon atoms, 4-17 carbon atoms, 4-18 carbon atoms, 4-19 carbon atoms, 4-20 carbon atoms, 4-21 carbon atoms, 4-22 carbon atoms, etc., as appropriate.

In an embodiment, the copolymer is selected from the group consisting of a copolymer of para and/or meta substituted [[(perfluorohexylethylene)oxy]methyl]-styrene and a haloalkyl styrene monomer; a copolymer of para and/or meta substituted [[(perfluorohexylethylene)thio]methyl]-styrene and a haloalkyl styrene monomer; a copolymer of poly[p/m-[[(perfluorohexylethylene)thio]methyl]-styrene and poly[chloromethylstyrene]; a copolymer of poly[p/m-[[(perfluorohexylethylene)oxy]methyl]-styrene and poly[chloromethylstyrene] and poly[chloromethylstyrene].

In accordance with an embodiment of the invention, segment A comprises a monomer selected from the group consisting of 2-(perfluorohexyl)ethyl alcohol, 2-(perfluorooctyl)ethyl thiol, 2-(perfluorooctyl)ethyl alcohol, 2-(perfluorohexyl)ethyl thiol, para and/or meta substituted [[(perfluorohexylethylene)oxy]methyl]-styrene, and para and/or meta substituted [[(perfluorohexylethylene)thio]methyl]-styrene. Without wishing to be bound by any particular theory or mechanism, the perfluorohydrocarbon provides oleophobic properties and improved adherence to the substrate.

In an embodiment, segment B comprises styrene and a halogen group, wherein the halogen group is chlorine. In another embodiment, segment B comprises a monomer selected from the group consisting of 4-vinylbenzyl chloride, 3-vinylbenzyl chloride, 3,4-vinylbenzyl chloride. The double bond in the styrene-group makes polymerization with other polymers easier and, due to the halogen group, which can be substituted with other functionalities, the styrene can be easily modifiable with one or more of a variety of functional groups, including positive- and/or negative-charged groups.

The copolymers can be prepared by any suitable technique. For example, a block copolymer can be prepared as illustrated in Scheme 1, and a random copolymer can be prepared as illustrated in Scheme 2.

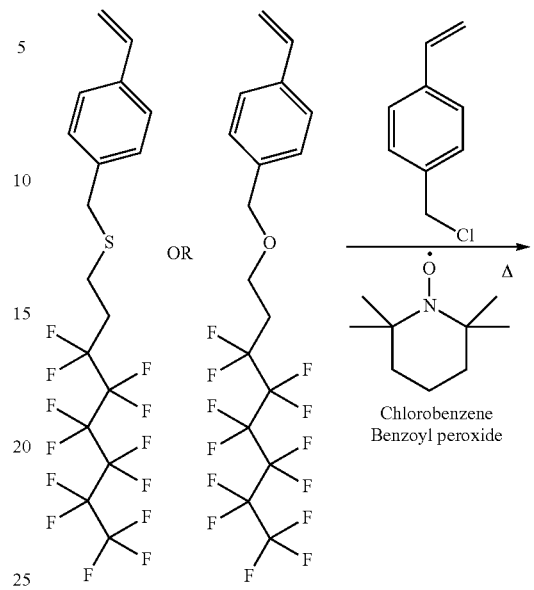

Scheme 1.

Chlorobenzene
Benzoyl peroxide

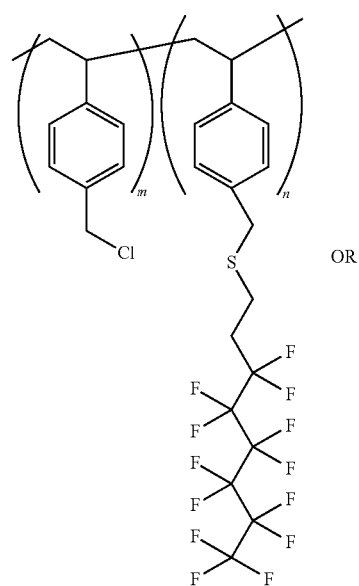

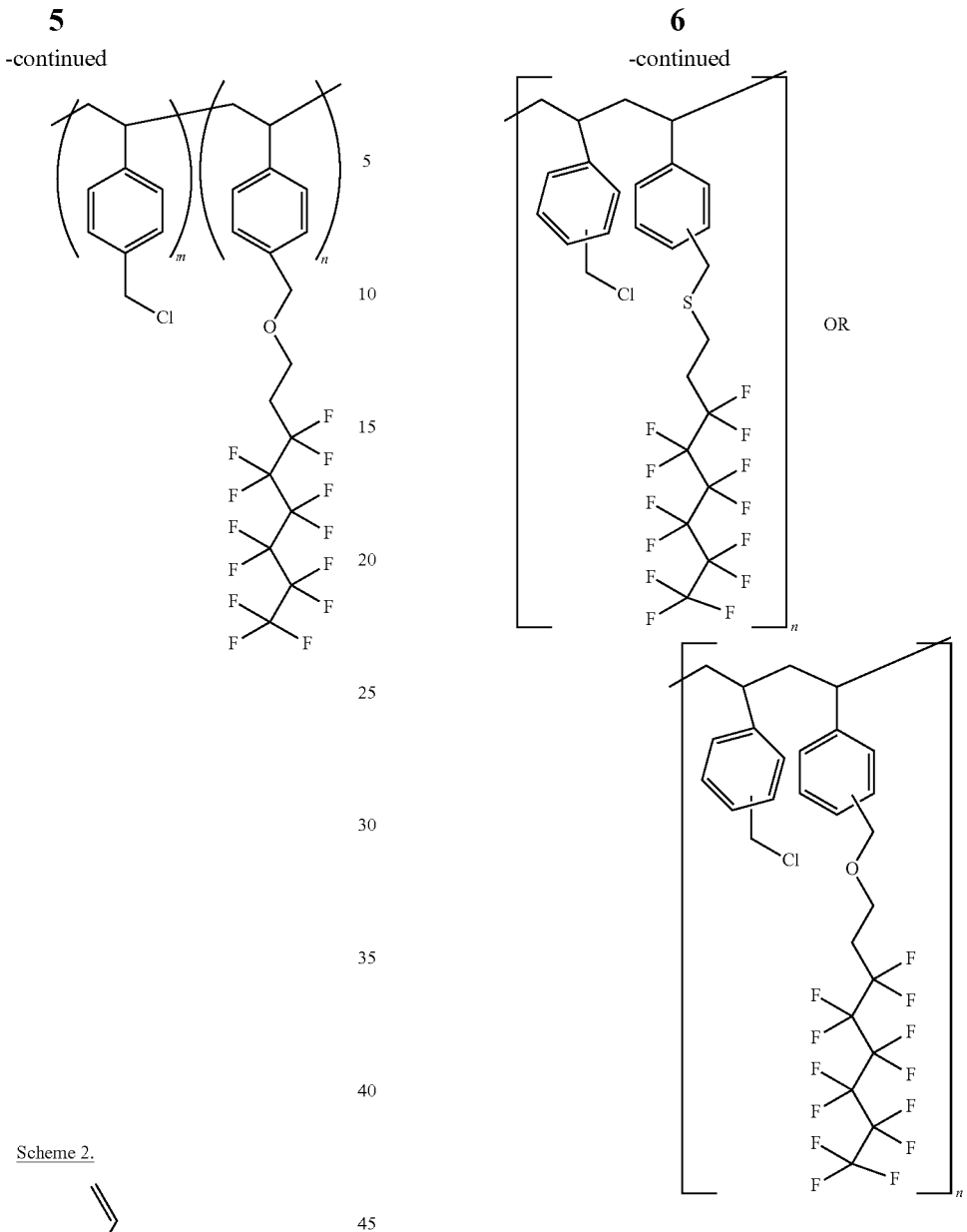

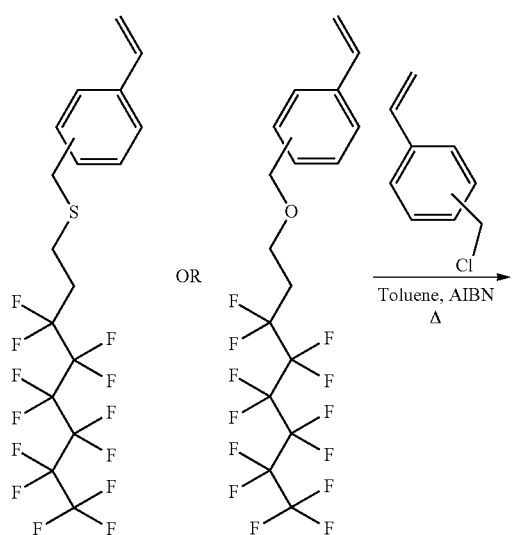

Scheme 2.

In an embodiment, the random copolymer can be synthesized by mixing 1.4 equivalents of 4-para or 3,4-para-mata-chloromethyl styrene with 1 equivalent of para or p, m-[[(perfluorohexylethylene)thio]methyl]-styrene in toluene at a suitable concentration, e.g., 66% by wt., of the p, m-[[(perfluorohexylethylene)thio]methyl]-styrene. 3 mol % of azobisisobutyronitrile (AIBN) is then added and mixture is degassed for 20 minutes, following which, the reaction mixture is stirred at suitable temperature, e.g., 60 degrees centigrade, for a suitable time, e.g., 14 hours. The reaction mixture is cooled and is diluted with acetone. The product obtained is precipitated in methanol and mixed for 2 hours. The solvent is decanted and the precipitate is redissolved in acetone. The product in acetone is reprecipitated in fresh methanol and filtered using a coarse fritted funnel, washed with methanol, and dried in a vacuum oven overnight.

In an embodiment, the number average molecular weight of the random copolymer is about 1 KDa to about 500 KDa, for example 10 KDa to about 50 KDa, and particularly about 20 KDa. In an embodiment, the number average molecular weight is 398 KDa. The number average molecular weight is determined by the use of GPC.

The block copolymer can be synthesized by any suitable process, including, e.g., atom transfer radical polymerization (ATRP), iodine transfer polymerization (ITP), anionic polymerization and other forms of nitroxide mediated radical polymerization (NMP).

The number average molecular weight of the block copolymer is about 1 KDa to about 9000 KDa, particularly 10 KDa to about 50 KDa, and more particularly about 20 KDa. While the molecular weight of the block copolymer would depend upon the duration of polymerization, the average molecular weight for the block is around 8178 KDa for an 86 hours run.

The present invention further provides a porous membrane comprising any of the copolymers described above disposed on a porous support, e.g., a porous polymeric support.

In an embodiment, the porous polymeric support is selected from PVC/PAN, polysulfone, polyethersulfone, HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

The present invention further provides a method of preparing a porous membrane comprising a copolymer as described above, the method comprising, in an embodiment:

(i) dissolving the copolymer in a solvent to obtain a solution comprising the copolymer;

(ii) casting the solution from (i) to obtain a coating;

(iii) evaporating the solvent from the coating; optionally (iv) washing the coating to obtain the porous membrane; and (v) optionally replacing one or more of the halo group of haloalkyl with a substituent selected from the group consisting of alkoxy, alkylcarbonyl, hydroxyalkyl. an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

When the halo group is optionally replaced with a substituent, as indicated above, the resulting copolymer has a higher surface tension value, for example, up to about 45 dynes/cm, particularly from about 40 to about 45 dynes/cm.

The optional replacement can be carried out by any suitable method. For example, porous membrane obtained at the end of step (iv) can be soaked for a suitable period of time in a solution of the modifying agent, e.g., iminodisuccinic acid (IDSA), in a mixture of water, NaOH, and DMF. The solution can be heated to 80° C. The membrane is then washed with water and isopropanol (IPA) and dried. The membrane is then soaked in HCl, rinsed with IPA, and dried.

In an embodiment, IDSA (15 g) is dissolved in a mixture of water (18 g), 8M NaOH (10 g) and DMF (45 g). The mixture is poured over membranes pre-wet with DMF in a petri dish. The membranes are heated to 80° C. overnight, rinsed with copious amount of water and then IPA. Afterwards, the membranes are dried at 80° for 1 hr. The membranes are soaked in 3% HCl for two hours, rinsed with water and IPA for 1 hour, and dried again at 80° C. for 45 minutes. Surface tension of the membranes range from 40-45 dynes/cm.

In another embodiment, iminodiacetic acid (IDA) (60 g) is dissolved in a mixture of water (120 g), 8M NaOH (140 g) and DMF (160 g). The mixture is then poured over membranes pre-wet with DMF in a petri dish. Membranes are heated to 80° C. overnight, rinsed with copious amount of water and then IPA. Afterwards, the membranes are dried at 80° for 1 hr. Membranes are soaked in 3% HCl for two hours, and rinsed with water and IPA, then dried again at 80° C. for 45 minutes. Surface tension of the resulting membranes range from 45-48 dynes/cm.

In yet another embodiment, triethylamine (TEA) 33% in water 50 (mL) is mixed with IPA (50 mL), and poly(pfotms-ran-cms) coated 0.2 μm PTFE with CWST of 23 dynes/cm is immersed in the solution overnight at room temperature. Afterwards, membrane is rinsed in copious amount of water and then soaked in IPA overnight. Membrane is dried at 80° C. for 30 minutes, and surface tension is measured. CWST is 38 dynes/cm In another embodiment, the invention provides a method of preparing a porous membrane comprising a copolymer as described above, the method comprising:

(i) dissolving the copolymer and a second polymer in a solvent to obtain a solution comprising the copolymer and the second polymer;

(ii) mixing the solution from (i) with a pore-forming powder to obtain a mixture;

(iii) casting the mixture from (ii) to obtain a coating;

(iv) evaporating the solvent from the coating;

(v) washing the coating to remove the pore-forming powder; and (vi) drying the resulting membrane; and (v) optionally replacing one or more of the halo group of haloalkyl with a substituent selected from the group consisting of alkoxy, alkylcarbonyl, hydroxyalkyl. an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

The porous membrane can be oleophobic, particularly an oleophobic membrane with a CWST of about 23 dynes/cm or less, e.g., 22 or 21 dynes/cm. The porous membrane can be, e.g., a functionally-as-made membrane, comprising the copolymer film or fiber without a porous support; or it can be a porous support coated with the copolymer.

CWST can be measured by a suitable method. In an embodiment, the method relies on a set of solutions of certain composition. Each solution has specific surface tension. The solutions surface tension ranges from 15 to 92 dyne/cm in small non-equivalent increments. To measure membrane surface tension, it is positioned on to top of white light table, one drop of a solution of certain surface tension is applied to the porous membrane surface and the time the drop takes to penetrate through the porous membrane and become bright white as an indication of light going through the porous membrane is recorded. Instant wetting is considered when the time the drop takes to penetrate the porous membrane is <10 seconds. If the time >10 seconds, the solution is considered to partially wet the porous membrane.

In accordance with an embodiment of the invention, the porous membrane is a porous membrane, e.g., a nanoporous membrane, for example, a porous membrane having pores of diameter between 1 nm and 100 nm, or a microporous membrane having pores of diameter between 1 μm and 10 μm.

The porous membrane may also be a functionalized membrane comprising one or more added functional groups on the copolymer. The porous membrane can be, e.g., a charged membrane. Functionalization of the copolymer membrane can result in a CWST up to about 50 dynes/cm. Functional groups include, e.g., a cation, an anion, or a polar group.

In accordance with embodiments of the invention, the porous membrane can have a variety of configurations, including planar, flat sheet, pleated, tubular, spiral, and hollow fiber. In one embodiment, the porous membrane is a hollow-fiber membrane.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The porous membrane can be a functionally-as-made membrane ("FAM Membrane"), which can be prepared, for example, as illustrated in FIG. 1, by blending of poly (pftoms-ran-cms) with a second polymer, e.g., PVC-AN, in THF and stirring at 600 rpm for 60 min, then adding dissolvable particles, such as NaHCO$_3$ particles, that achieve the desired pore size into solution and stirring at 1500 rpm for 120 min. This mixture is then cast onto a PET substrate on a glass plate. After slow evaporation of THF at room temperature, membrane is soaked in a dilute HCl solution over night to remove particles. The resulting membrane is dried at a suitable temperature, e.g., 40° C. to 100° C., in particular 80° C., depending on the boiling point of the solvent, in an oven or at room temperature for a suitable time to remove the solvent, for example, 60 min.

Suitable second polymers include PVC-AN, HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

Other dissolvable or removable particles which can be used in the method above include potassium carbonate, zeolite, cellulose, soluble fibers, silica particles, and nanoparticles; example zinc oxide.

The porous membrane can comprise the copolymer in one of many ways. For example, the porous membrane may include a coating comprising the copolymer. The coated membrane can be made, for example, by membrane coating, which is performed by dissolving 2% copolymer in acetone and membrane is dipped in the polymer solution for 2 seconds. The resulting membrane is dried in an oven at a suitable temperature, e.g., 80° C., for about 20 minutes, and the porous membrane is soaked in IPA for about 2 hours, dried in an oven for 30 minutes at 80° C., and surface tension and weight gain is measured. SEM micrographs of examples of membranes are depicted in FIG. 2.

The porous membrane can be modified to include one or more functional groups. A general scheme for constructing a functionalized membrane is shown in FIG. 4. The porous membrane can be functionalized with a charged group. For example, in one embodiment, the porous membrane is functionalized with an anionic group. Preparation of the anionic membrane includes, e.g., dissolving EDTA (40 g) in a mixture of water (100 g), 8M NaOH (100 g), and DMF (200 g). The mixture is then poured over membranes which had been pre-wet with DMF in a Petri dish. Membranes are heated to 80° C. overnight, rinsed with copious amount of water and then IPA. The porous membranes are dried at 80° C. for 1 hr and soaked in 3% HCl for two hours, and rinsed with water and IPA, then dried again at 80° C. for 45 minutes. Surface tension of membranes ranged from 45-50 dynes/cm. Membranes obtained in this method removed 99% of most trace metals from isopropyl alcohol.

The fluorinated chain must be present in at least 35% by volume of the polymer in order to impart oleophobicity to the porous membrane.

Additionally, the volume ratio of the perfluoro-styrene block in the random copolymer must not be greater than 50% for the polymer to be soluble in non-fluorinated solvents.

In another embodiment, the porous membrane is functionalized with a cationic group which can be prepared by, e.g., by mixing triethylamine 33% in water 50 (mL) with IPA (50 mL), and immersing a porous membrane, e.g., PTFE, in the mixture overnight at room temperature. Afterwards, membrane is rinsed with water and soaked in IPA overnight. Membrane is dried at 80° C. for 30 minutes, and surface tension is measured. CWST was 38 dynes/cm.

The present invention includes the following embodiments, but not limited to:

1) A random copolymer comprising Segment A and Segment A, wherein Segment A is poly[p/m-[[(perfluorohexylethylene)thio]methyl]-styrene or poly[p/m-[[(perfluorohexylethylene)oxy]methyl]-styrene; and Segment B is chloromethyl styrene;
2) A block copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is chloromethyl styrene;
3) A functionalizable random copolymer and a functional group, the random copolymer comprising Segment A, Segment A, wherein Segment A is poly[p/m-[[(perfluorohexylethylene)thio]methyl]-styrene or poly[p/m-[[(perfluorohexylethylene)oxy]methyl]-styrene; Segment B is chloromethyl styrene; and the functional group comprises a hydrophilic, hydrophobic, positively or negatively charged functional group;

4) A functionalizable block copolymer and a functional group, the block copolymer comprising Segment A, Segment B, wherein Segment A is poly[p/m-[[(perfluorohexylethylene)thio]methyl]-styrene or poly[p/m-[[(perfluorohexylethylene)oxy]methyl]-styrene; Segment B is chloromethyl styrene; and the functional group comprises a hydrophilic, hydrophobic, positively or negatively charged functional group;

5) A porous membrane comprising a hydrophilic, hydrophobic or charged membrane and a coating comprising a random copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is chloromethylstyrene; wherein, when coated with the copolymer, the porous membrane is an oleophobic membrane with a surface tension of 23 dynes/cm or less;

6) A functionalized membrane comprising a hydrophilic, hydrophobic or charged membrane and a coating comprising a random copolymer and a functional group, the random copolymer comprising Segment A, Segment B, and a functional group, wherein Segment A is poly[p/m-[[(perfluorohexylethylene)thio]methyl]-styrene or poly[p/m-[[(perfluorohexylethylene)oxy]methyl]-styrene; Segment B is chloromethyl styrene; the functional group is a charged group or a hydrophilic group; wherein, when coated, the porous membrane has a surface tension of 23 dynes/cm or less;

7) A porous membrane comprising a hydrophilic, hydrophobic or charged membrane and a coating comprising a block copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is chloromethyl styrene; wherein, when coated with the copolymer, the porous membrane is an oleophobic membrane with surface tension of 23 dynes/cm or less;

8) A charged membrane comprising a hydrophilic, hydrophobic, or charged membrane and a coating comprising a random copolymer and a functional group, the random copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; Segment B is chloromethyl styrene; the functional group comprises ethylenediamine tetraacetic acid, iminodiacetic acid or iminodisuccinic acid; wherein, when coated with the copolymer, the porous membrane has a surface tension of up to 50 dynes/cm that can be used for removal of trace metal ions from microelectronic fluids and water;

9) An oleophobic, functionally-as-made membrane comprising a blend of a first polymer and a random copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; Segment B is chloromethyl styrene; wherein the porous membrane has a surface tension of 23 dynes/cm or less;

10) An oleophobic hollow fiber membrane with surface tension of 23 dynes or less, the porous membrane comprising a polymer for the porous membrane (such as, e.g., PES, PTFE, PVDF PVC/AN, PP, PE, HDPE, PET, PPS and PPSU) and a random or block copolymer comprising Segment A and Segment B, wherein Segment A is poly[p/m-[[(perfluorohexylethylene)thio]methyl]-styrene or poly[p/m-[[(perfluorohexylethylene)oxy]methyl]-styrene; and Segment B is chloromethyl styrene.

The porous membrane, according to embodiments of the invention, can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, the porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

The present invention further provides a method of filtering a fluid, the method comprising passing the fluid through ant of the porous membranes described above. For example, trace metal impurities continue to pose a problem in the manufacture of next generation semiconductor and microelectronics materials. One embodiment of the invention comprises a method of removing metals from a fluid, particularly a microelectronics fluid, by passing the metal-containing fluid through a porous membrane including the copolymer and removing the metals from the fluid. In one embodiment, the inventive method includes passing the metal-containing fluid through a functionalized porous membrane including the copolymer and a functional group and removing the metals from the fluid. The functionalized membrane can remove about 99% of most trace metals from the fluid.

Examples of trace metals include Li, Na, K (and other Group 1 metals); Mg, Ca (and other Group 2 metals); Al (and other Group 3 metals), Pb (and other Group 4 metals), Sb, Bi (and other Group 5 metals), and Cd, Cr, Mo, Pd, Ag, W, V, Mn, Fe, Ni, Cu, Zn (and other Transition metals).

Advantageously, the copolymer can impart oleophobic properties to a material, such as, e.g., a porous membrane, providing a surface tension of 23 dynes or less on the material without the need for post-treatment. A porous membrane, including the copolymer, is stable in acids, bases, organic solvents, oxidizers, and stable at high temperatures and against gamma irradiation. High water breakthrough pressures and air flow rates can be achieved in the porous membrane, and it can be easily functionalized, such as, e.g., with cationic and anionic groups.

The porous membrane can be used to remove trace metals, for example, so that the filtrate has a concentration of 0.005 ppb or down to the detection limit of the instrument, from water and organic fluids in many applications, such as, e.g., those in the microelectronics industry. In an embodiment, the fluid being treated contains 1 ppb or more of a trace metal, and the filtrate has a trace metal concentration of 0.005 ppb.

The following examples further illustrate the invention but, of course, should not be construed as in any way limiting its scope.

Example 1

This example illustrates the preparation of a random copolymer of p-[[(perfluorohexylethylene)thio]methyl]-styrene and chloromethyl styrene, or poly(pfotms-ran-cms), in accordance with an embodiment of the invention.

In a 250 mL oven dried round bottom flask was mixed perfluorohexyl ethyl thiomethyl styrene (60.3 g, 121.6 mmol), 4-chloromethyl styrene 26 g, 171 mmol, 1.4 equivalent), toluene (20 mL) and AIBN (838 mg, 5 mmol, 3 mol %). The reaction mixture was degassed with nitrogen gas at 0° C. for 45 minutes, and stirred at 60° C. for 14 hours, after which reaction mixture was cooled and 30 mL acetone was added. The copolymer product was precipitated in methanol (1 L) and mixed for 2 hours. The solvent was decanted and the precipitate was redissolved in acetone (200 mL). The product in acetone was reprecipitated in fresh methanol (2 L), filtered, washed with methanol (500 mL), and dried in vacuum oven overnight. The resulting copolymer weighed 58 g. $^1$H NMR spectrum confirmed the structure of the copolymer:

A random copolymer of p-[[(perfluorootylethylene)thio] methyl]-styrene and chloromethylstyrene, ((poly(pfdtms-ran-cms)) was also synthesized using the same procedure.

Example 2

This example illustrates the preparation of membranes from poly(pfotms-ran-cms), in accordance with an embodiment of the invention.

The random copolymer was dissolved in acetone and cast on a porous support. Thus, 2% copolymer solution in acetone was prepared and a porous support, either PTFE or PES, was dipped in the copolymer solution for 2 seconds. The resulting coated support is dried in an oven at 80° C. for 20 minutes, and soaked in IPA for 2 hours, dried in an oven for 30 minutes at 80° C., and surface tension and weight gain were measured. The weight gain and surface tension results obtained are set forth in Tables 1-2.

TABLE 1

Weight gain results of poly(pfotms-ran-cms) coated on PTFE

| 0.2 µm PTFE | Poly(pfotms-ran-cms coating on 0.2 µm PTFE | | |
|---|---|---|---|
| | Initial Weight | Final weight after coating | % Weight Gain |
| Membrane 1 | 0.2905 | 0.3618 | 24 |
| Membrane 2 | 0.3129 | 0.389 | 24 |
| Membrane 3 | 0.312 | 0.3621 | 16 |
| Membrane 4 | 0.3077 | 0.373 | 21 |
| Membrane 5 | 0.6416 | 0.7958 | 24 |

TABLE 2

Surface Tension Measurements of the Coated Membrane; Airflow/Water Breakthrough Characterization

| | CWST** (dynes/cm) | AFR (slpm) @13.5 psi | WBT (psi) | CWST After EDTA Modification |
|---|---|---|---|---|
| 1.5% poly(pfotms-ran-cms) on 0.2 µm PTFE membrane | 22.85 | 11.1 | 40 | 50 |
| Control 0.2 µm PTFE | 26.6 | 26 | 50 | |
| 1.5% poly(pfotms-ran-cms) on Supported 0.2 µm PTFE | 22.85 | 201 | 7.98 | |
| 2% poly(pfotms-ran-cms) on 0.8 µm PES | 22.85 | 19.4 | 33.72 | |
| 0.8 µm PES control | 85.0 | 0 | 0 | |

Example 3

This example illustrates the preparation of a block copolymer of perfluorohexyl ethyl thiol and chloromethyl styrene, poly(pfotms-b-cms), in accordance with an embodiment of the invention.

Poly(pfotms-block-cms) was synthesized by sequential polymerization of chloromethyl styrene and then perfluorohexy ethyl thiomethyl styrene which was added after 40 h. A solution of chloromethyl styrene (14.5 ml, 100 mmol in 6.5 mL chlorobenzene), recrystallized benzyl peroxide (BPO) (0.242 g, 1 mmol) and TEMPO (0.2 g, 1.3 mmol) was charged into a round-bottomed flask. After being degassed in an ice water bath for 20 min, the reaction mixture was heated at 95° C. for 3 h to decompose BPO completely, and at 125° C. for 40 h to allow the polymerization to proceed. The reaction mixture was cooled to room temperature, diluted with 3 mL chlorobenzene, and pfotms (31.18 g, 62.9 mmol in 6 mL chlorobenzene) was added. The mixture was degassed as before. The reaction was carried out at 130° C. for 24 h. The block copolymer was obtained after dilution with chloroform (100 mL), precipitation from methanol, and drying to yield 88% from monomer. NMR result showed a cms/pfotms ratio of 1/0.62. DSC results indicated that the block copolymer had two Tgs (53° C. and 79° C.). $^1$H NMR spectrum of the block copolymer confirmed the structure of the copolymer. Table 3 shows some of the properties, e.g., Tg, of the block copolymer.

A block copolymer of p-[[(Perfluorootylethylene)thio] methyl]-Styrene and chloromethyl styrene, poly(pfdtms-b-cms) was also synthesized using the same procedure.

TABLE 3

Molecular weights of the random and block copolymers measured by GPC

| Polymer | Tg1, ° C. | Tg2, ° C. | Av. Mn (kD) | Av. Mw (kD) | Solubility |
|---|---|---|---|---|---|
| Poly(pfotms-ran-cms) | 50 | — | 10.6 | 19.85 | Acetone |
| Poly(pfotms-b-cms) | 53 | 79 | 3982.91 | 8177.93 | DMF |

Example 4

This example illustrates a method of preparing a porous membrane from a copolymer in accordance with an embodiment of the invention.

p-[[(perfluorooctylethylene)thio]methyl]-styrene and chloromethyl styrene (Poly(pfdtms-ran-cms)) and polyvinyl chloride/acrylonitrile (PVC-AN) were blended as follows. Poly(pfdtms-ran-cms) and PVC-AN are mixed in THF and stirred at 600 rpm for 60 min. NaHCO$_3$ particles having an average particle size of 1.79 µm were added to the solution and stirred at 1500 rpm for 120 min. The polymer blend was then cast onto a glass plate coated with PEG 400. Alternatively, the polymer blend was cast onto a PET substrate mounted on a glass plate. After slow evaporation of THF at room temperature, the resulting membrane was soaked and etched in a dilute HCl solution over night to remove particles and dried at 80° C. oven for 60 min.

TABLE 4

Air flow, Water Breakthrough Pressure & Surface Tension Characterization of as cast Oleophobic PVC/AN membrane

| Property | Performance |
| --- | --- |
| CWST | 21.62 dynes/cm |
| AFR (SLPM @ 5 psi) | 49 |
| WBT (psi) | 2.02 |

TABLE 5

Air Flow rate and Surface Tension Characterization of as cast Oleophobic PVC/AN Membrane

| Property | Performance |
| --- | --- |
| CWST | 21.62 dynes/cm |
| AFR (SLPM @ 5 psi) | 22.85 |

The resulting membrane was charge-modified by treatment with EDTA, iminodisuccinic acid (IDSA), triethylamine (TEA) or iminodiacetic acid (IDA). Table 6 sets forth charge density values of the porous membrane modified by IDA, EDTA, and TEA.

TABLE 6

Charge Density of Anionic and Cationic Membranes by Elemental Analysis
Charge Density of Modified Membranes by Combustion Analysis

| Sample | Charge Density (mmol)/g membrane |
| --- | --- |
| IDA | 3.4 |
| EDTA | 3.4 |
| TEA | 1.9 |

Example 5

This example illustrates a method of removing trace metal ions from microelectronics fluids, particularly water and isopropanol, using the EDTA or IDA modified membranes of Example 4.

Figure 5:
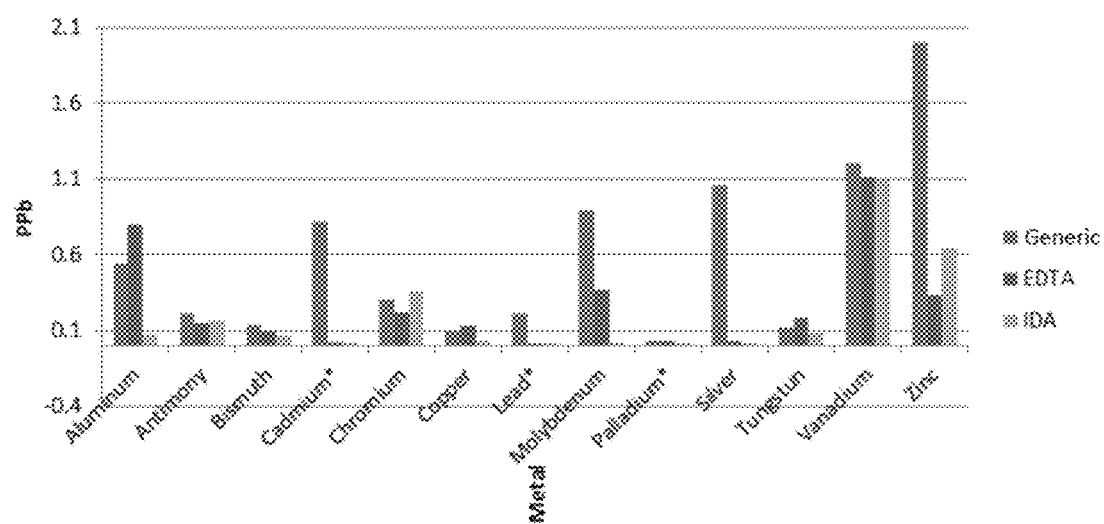
FIG. 5 depicts the efficiency of metal removal of membranes prepared in accordance with an embodiment of the invention.

Metal ion removal efficiency of the porous membrane in accordance with an embodiment of the invention is tested by filtering isopropanol spiked with 1 ppb of several metals through the modified membranes. Prior to testing, all the testing equipment are soaked in 3% HCl for 24 hours and flushed in deionized water (DIW). Three 47 mm disks are cut out from three different flat sheet media samples. Each disk is placed in the housing in order to be challenged. Each sample is flushed sequentially with 100 mL of IPA, followed by 100 mL of 5% HCl and finally 200 mL of DIW. 20 mL of IPA is flushed through the porous membrane and the last 10 mL is collected as the media blank. Each sample is challenged with IPA spiked with 1 ppb metals. An effluent flow rate of 7 mL/min is established. The initial 10 mL of effluent is discarded. The following 10 mL of effluent is collected into PFA bottles. Influent and all effluent samples are collected for ICP-MS analysis. FIG. 5 shows concentration of metals in the filtrate. The metal removal rates of the inventive membranes are superior to the metal removal rates of a generic membrane.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A copolymer comprising polymerized monomeric units I and II, wherein:
monomeric unit I is of the formula A-X—CH$_2$—B, wherein A is Rf-(CH$_2$)n, Rf is a perfluoro alkyl group of the formula CF$_3$—(CF$_2$)$_x$—, wherein x is 3-12, n is 1-6, X is S, and B is vinylphenyl,
monomeric unit II is haloalkyl styrene, and further wherein one or more of the halo groups of the haloalkyl groups present in the copolymer have been replaced with a substituent selected from the group consisting of alkoxy, alkylcarbonyl, hydroxyalkyl, an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

2. The copolymer of claim 1, wherein n=2.

3. The copolymer of claim 1, wherein x=4-8.

4. The copolymer of claim 1, wherein monomeric unit II is chloroalkyl styrene.

5. The copolymer of claim 1, wherein the haloalkyl is chloromethyl.

6. The copolymer of claim 1, which is a block copolymer.

7. The copolymer of claim 1, which is a random copolymer.

8. A porous membrane comprising a copolymer and a porous support,
wherein the copolymer comprises polymerized monomeric units I and II, wherein:
monomeric unit I is of the formula A-X—$CH_2$—B, wherein A is Rf-$(CH_2)n$, Rf is a perfluoro alkyl group of the formula $CF_3$—$(CF_2)_x$—, wherein x is 3-12, n is 1-6, X is O or S, and B is vinylphenyl,
monomeric unit II is haloalkyl styrene, and further
wherein one or more of the halo groups of the haloalkyl groups present in the copolymer have been replaced with a substituent selected from the group consisting of alkoxy, alkylcarbonyl, hydroxyalkyl, an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

9. The porous membrane of claim 8, wherein the porous support is a porous polymeric support.

10. The porous membrane of claim 9, wherein the porous polymeric support is selected from PVC/PAN, polysulfone, polyethersulfone, HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

11. A method of preparing a porous membrane according to claim 8,
the method comprising:
(i) dissolving the copolymer in a solvent to obtain a solution comprising the copolymer;
(ii) casting the solution from (i) on the porous support to obtain a coating;
(iii) evaporating the solvent from the coating; optionally
(iv) washing the coating to obtain a porous membrane; and
(v) replacing one or more of the halo group of haloalkyl with a substituent selected from the group consisting of alkoxy, alkylcarbonyl, hydroxyalkyl, an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

12. A method of preparing a porous membrane according to claim 8,
the method comprising:
(i) dissolving the copolymer and a second polymer in a solvent to obtain a solution comprising the copolymer and the second polymer; wherein said second polymer forming said porous support;
(ii) mixing the solution from (i) with a pore-forming powder to obtain a mixture;
(iii) casting the mixture from (ii) to obtain a coating;
(iv) evaporating the solvent from the coating;
(v) washing the coating to remove the pore-forming powder; and
(vi) drying the resulting membrane; and
(vii) replacing one or more of the halo group of haloalkyl with a substituent selected from the group consisting of alkoxy, alkylcarbonyl, hydroxyalkyl, an acidic group, a basic group, a cation, an anion, a zwitterion, hydroxyl, acyloxy, alkylthio, aldehydo, amido, carbamoyl, ureido, cyano, nitro, ethylenediamine tetra acetic acid, iminodiacetic acid, and iminodisuccinic acid.

13. A method of filtering a fluid, the method comprising passing the fluid through the porous membrane of claim 8.

14. A method of filtering a fluid, the method comprising passing the fluid through the porous membrane of claim 9.

15. A method of filtering a fluid, the method comprising passing the fluid through the porous membrane of claim 10.

\* \* \* \* \*